US008643670B2

(12) United States Patent
Tunnell, IV

(10) Patent No.: US 8,643,670 B2
(45) Date of Patent: Feb. 4, 2014

(54) COLLABORATIVE MAPBOARD SYSTEM

(76) Inventor: Harry D. Tunnell, IV, Fort Wayne, IN (US)

( * ) Notice: Subject to any disclaimer, the term of this patent is extended or adjusted under 35 U.S.C. 154(b) by 1012 days.

(21) Appl. No.: 12/485,038

(22) Filed: Jun. 15, 2009

(65) Prior Publication Data

US 2010/0171755 A1 Jul. 8, 2010

Related U.S. Application Data

(60) Provisional application No. 61/142,713, filed on Jan. 6, 2009.

(51) Int. Cl.
*G09G 5/00* (2006.01)

(52) U.S. Cl.
USPC ............ 345/629; 345/619; 701/532; 358/506

(58) Field of Classification Search
USPC ..................... 345/629, 619; 701/532; 358/506
See application file for complete search history.

(56) References Cited

U.S. PATENT DOCUMENTS

| | | | | |
|---|---|---|---|---|
| 5,029,899 A | * | 7/1991 | Schieppati et al. | 281/30 |
| 5,523,769 A | * | 6/1996 | Lauer et al. | 345/1.3 |
| 5,647,156 A | * | 7/1997 | Hull et al. | 40/661 |
| 5,732,978 A | * | 3/1998 | Tunnell, IV | 283/34 |
| 6,630,938 B1 | * | 10/2003 | Nanni | 345/629 |
| 6,801,343 B1 | * | 10/2004 | Sheng | 358/474 |
| 2002/0054048 A1 | * | 5/2002 | Nah et al. | 345/698 |
| 2004/0109096 A1 | * | 6/2004 | Anderson et al. | 348/832 |
| 2011/0096091 A1 | * | 4/2011 | Milewski et al. | 345/629 |

OTHER PUBLICATIONS

"Using Microsoft Word 2000", 1999 pp. 2-3.*

* cited by examiner

*Primary Examiner* — Michelle L Sams
(74) *Attorney, Agent, or Firm* — Faegre Baker Daniels LLP

(57) ABSTRACT

The present invention provides a system for sharing mapped information between multiple maps, including maps in different media states, in an accurate fashion. The system comprises a transparent overlay for transferring the mapped information, an alignment device for consistently aligning the displayed maps relative to the transparent overlay, and a fastening mechanism for securing the transparent overlay to a mapboard. The system may also include a mapboard, an electronic mapboard, and a computer. The system enables a user to accurately share information added to a map, possibly a digital or paper map, by recording the information onto the transparent overlay. The transparent overlay may then be transferred to a different map, possibly displayed in a different media, where the transparent overlay accurately reflects the recorded information. The use of an alignment device for consistently aligning the displayed maps relative to the transparent overlay, both when the mapped information is being recorded and reflected, ensures the information transferred between the maps is reflected accurately.

9 Claims, 4 Drawing Sheets

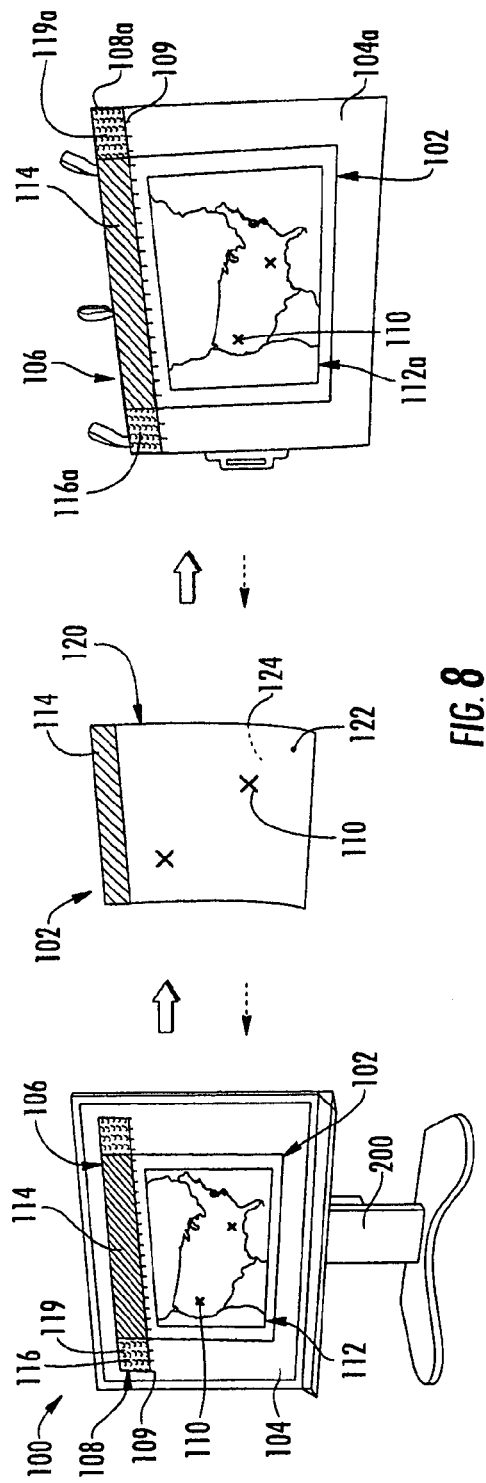
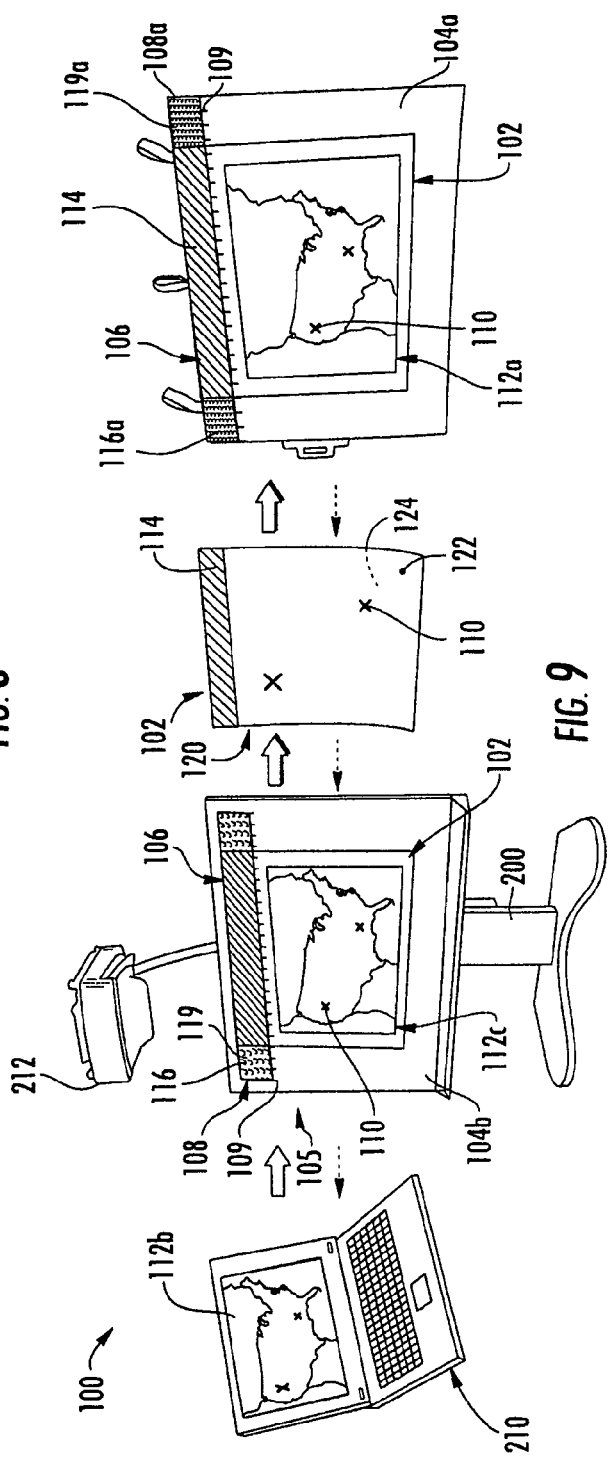
FIG. 8
FIG. 9

COLLABORATIVE MAPBOARD SYSTEM

RELATED APPLICATIONS

This application claims the benefit of U.S. Provisional Patent Application Ser. No. 61/142,713, filed Jan. 13, 2009, titled COLLABORATIVE MAPBOARD SYSTEM, the disclosure of which is expressly incorporated by reference herein.

This application is related to U.S. Pat. No. 5,732,978 to Tunnell, titled Weather Resistant Mapboard Assembly, the disclosure of which is expressly incorporated by reference herein.

FIELD OF THE INVENTION

The present invention relates to systems for displaying maps and, more specifically, to a system for sharing graphical information, relating to a map, between maps.

BACKGROUND ART

Traditional methods of using paper maps for mapping graphical information relating to the map (maps include all forms of representations of the Earth's surface such as digital imagery, aerial photographs, etc.), are well known to individuals in the military, land developing, environmental research, law enforcement, geographic survey, nautical, aviation, and emergency response agencies. However, traditional methods of using paper maps can make sharing precise mapped information, between members in electronically equipped command centers and members in austerely equipped or remote locations, difficult. Further improvements in systems for sharing mapped information are desired.

SUMMARY OF THE INVENTION

The present invention involves a communication system for sharing graphical information relating to a map comprising: a transparent overlay, an alignment device, and a mechanism for fastening the transparent overlay to the alignment device such that the transparent overlay covers a displayed map.

In use, a conventional paper map is displayed in traditional fashion on a mapboard, potentially with a wall mounted Weather Resistant Mapboard Assembly (U.S. Pat. No. 5,732,978 to Tunnell). This application expressly incorporates the entire disclosure by reference Tunnell. The alignment device is coupled to the mapboard such that when the transparent overlay affixes to the alignment device, the transparent overlay covers all, or at least the relevant portion of the displayed map. A fastening mechanism, for example a hook and loop fastener system or potentially snap buttons with male and female couplings, fastens the transparent overlay to the mapboard. Graphical information relating to a map, or mapped information, may be recorded onto the transparent overlay and the transparent overlay may then be transferred to other displayed maps such as maps displayed on a Weather Resistant Mapboard Assembly or a digital map displayed on an electronic whiteboard. When the transparent overlay is transferred to a map displayed on a different mapboard, an alignment device coupled to the second mapboard aligns the transparent overlay relative to the displayed map ensuring the mapped information recorded on the transparent overlay is relayed between the plurality of displayed maps in an accurate fashion.

Embodiments of the invention further comprise a computer with a common map software (for example Google Earth Pro) and potentially an electronic whiteboard. A computer may electronically communicate with an electronic whiteboard in a manner allowing for exchange of mapped information from a transparent overlay to the computer or from the computer to a transparent overlay through projection of mapped information onto the electronic whiteboard. For example, a transparent overlay with mapped information recorded on it may be affixed with a fastening mechanism and aligned, with an alignment device, on an electronic whiteboard in communication with a computer displaying a map. The mapped information may then be electronically communicated to the computer by tracing over the mapped information recorded on the transparent overlay in a manner causing the electronic whiteboard to be touched, or by scanning the mapped information, or by another form of electronic transfer. The mapped information, when electronically communicated to the computer, is then capable of being incorporated into the digital map. Likewise, mapped information may be input to a digital or analog map displayed on a computer, and the digital map containing the mapped information may be projected onto an electronic whiteboard or a mapboard. A transparent overlay may be affixed to the electronic whiteboard or mapboard aligned over the displayed digital or analog map containing the mapped information. The mapped information may then be recorded onto the transparent overlay using one or more of a grease pen, marker, or adhesive stickers. The transparent overlay, with the recorded mapped information, then transfers the mapped information to a map displayed on another electronic whiteboard, or a conventional mapboard, containing an alignment device. The alignment device ensures the mapped information on the transparent overlay is accurately aligned with regards to the geographical and spatial arrangement of the underlying displayed map. The invention can be further expanded to sharing other types of information between analog, digital, and manual processes.

BRIEF DESCRIPTION OF THE DRAWINGS

The features of this invention, and the manner of attaining them, will become more apparent and the invention itself will be better understood by reference to the following description of embodiments of the invention taken in conjunction with the accompanying drawing.

FIG. 8 is a transformational perspective view, illustrating an embodiment of a collaborative mapboard system for transferring graphic information relating to a map, between maps displayed in the same media state.

FIG. 9 is a transformational perspective view, illustrating an embodiment of a collaborative mapboard system for transferring graphic information relating to a map, between maps displayed in different media states.

Although the drawings represent an embodiment of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DETAILED DESCRIPTION OF THE DRAWINGS

The embodiments discussed below are not intended to be exhaustive or limit the invention to the precise forms disclosed in the following detailed description. Rather, the embodiments are chosen and described so that others skilled in the art may utilize their teachings.

Figure 1:
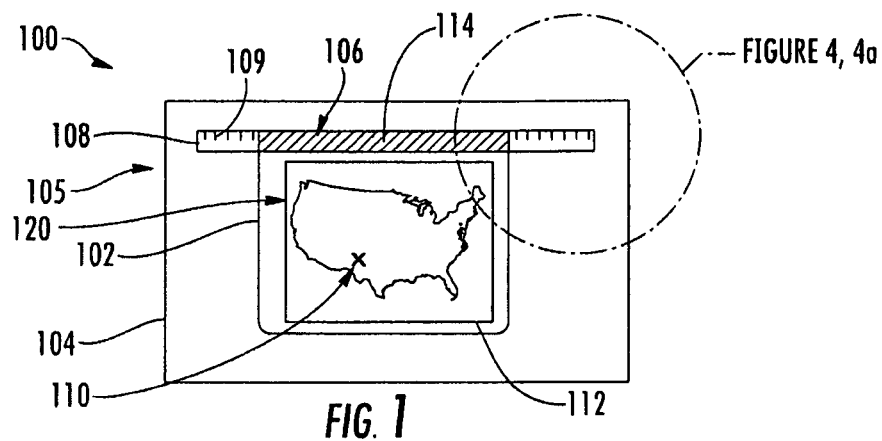
FIG. 1 is a plan view of a mapboard with a transparent overlay aligned over a displayed map.

Referring to FIG. 1, collaborative mapboard system 100 is illustrated as having transparent overlay 102, fastening mechanism 106, and alignment device 108. Further, the illustrated collaborative mapboard system 100 of FIG. 1 includes a mapboard 104 displaying a map 112.

FIG. 1 further illustrates fastening mechanism 106 including donor strip 114, located across upper portion 120 of transparent overlay 102, and receiving strip (see FIG. 4) 116 positioned horizontality across top portion 105 of mapboard 104. Although FIG. 1 illustrates both donor strip 114 and receiving strip 116 as single strips approximately two inches in width, alternate configurations exist.

Figures 2, 2A:
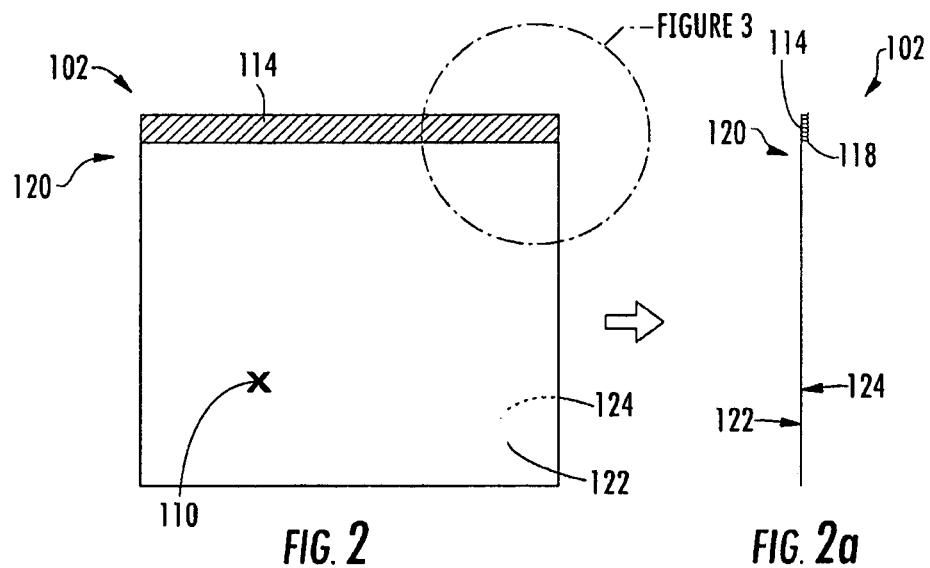
FIG. 2 shows a plan view of an exemplary transparent overlay with mapped information recorded on it.
FIG. 2a is a side view of the transparent overlay of FIG. 2.
Figure 2B:
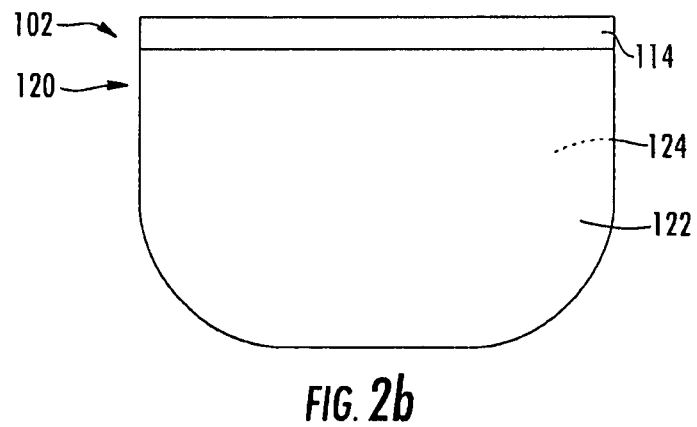
FIG. 2b shows a plan view of another exemplary transparent overlay without mapped information recorded on it.

Referring to FIG. 2, transparent overlay 102 is illustrated as comprising a square transparent sheet, although alternate embodiments may include a transparent overlay 102 comprising a rectangular or a round sheet (see FIG. 2b). Positioned horizontally across upper portion 120 of transparent overlay 102 is donor strip 114 of fastening mechanism 106 (see FIG. 1).

Referring to FIG. 2a, transparent overlay 102 is illustrated as having a forward surface 122 and a back surface 124. Donor strip 114 is illustrated as spanning horizontally and lengthwise across upper portion 120 of transparent overlay. Donor strip 114 is illustrated as comprising hook components 118 of fastening mechanism 106 (see FIG. 1) comprising hook 118 and loop 119 components (see FIG. 4).

Returning briefly to FIG. 2, transparent overlay 102 is further illustrated with mapped information 110 recorded on forward surface 122 of transparent overlay 102. Mapped information 110 is capable of being recorded on transparent overlay 102 through either permanent or temporary means including one or more of a grease pen, marker, or adhesive sticker. Although mapped information 110 is illustrated as recorded on forward surface 122 of transparent overlay 102, embodiments in which mapped information 110 is recorded on back surface 124 of transparent overlay 102 are envisioned.

Figures 3, 3A:
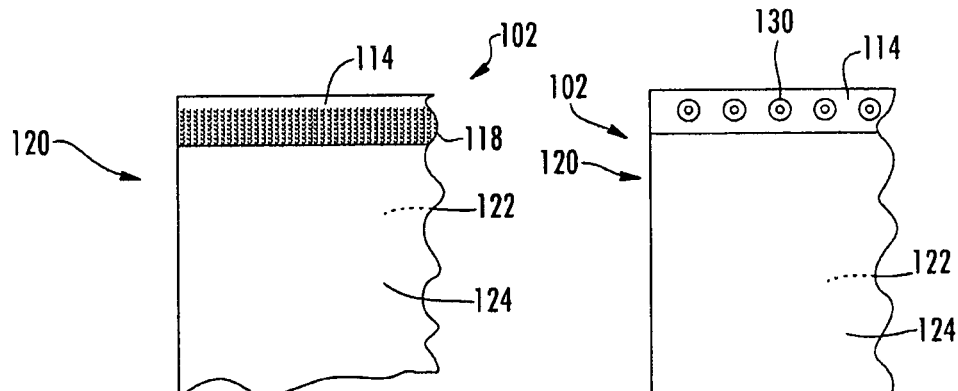
FIG. 3 is a partial plan view of the encircled portion of FIG. 2, illustrating an exemplary fastening mechanism component.
FIG. 3a is another partial plan view of the encircled portion of FIG. 2, illustrating an exemplary fastening mechanism component.

Referring to FIG. 3, back surface 124 of the encircled portion of FIG. 2 illustrates transparent overlay 102 having donor strip 114 across upper portion 120. Donor strip 114 is illustrated as comprising hook components 118 of a fastening mechanism 106 (see FIG. 1) comprising hook 118 and loop 119 components (see FIG. 4). Although the present embodiment illustrates donor strip 114 having hook components 118, it is envisioned that donor strip 114 may comprise either of hook 118 or loop 119 components of fastening mechanism 106.

FIG. 3a illustrates a further embodiment of the encircled portion of FIG. 2. Transparent overlay 102 is illustrated comprising donor strip 114 across upper portion 120 with donor strip 114 comprising male couplings 130 of a fastening mechanism 106 (see FIG. 1) comprising male 130 and female 132 couplings (see FIG. 4a). Although the present embodiment illustrates donor strip 114 comprising male couplings 130, it is envisioned that donor strip 114 may comprise either of female 132 (see FIG. 4a) or male 130 couplings of fastening mechanism 106.

Although FIG. 3 and FIG. 3a illustrate donor strip 114 as approximately two inches in width and approximately equal to the length of upper portion 120 of transparent overlay 102, alternate configurations exist. For example, donor strip 114 may be positioned vertically, to a side of, or on the corners of, transparent overlay 102.

Figures 4, 4A:
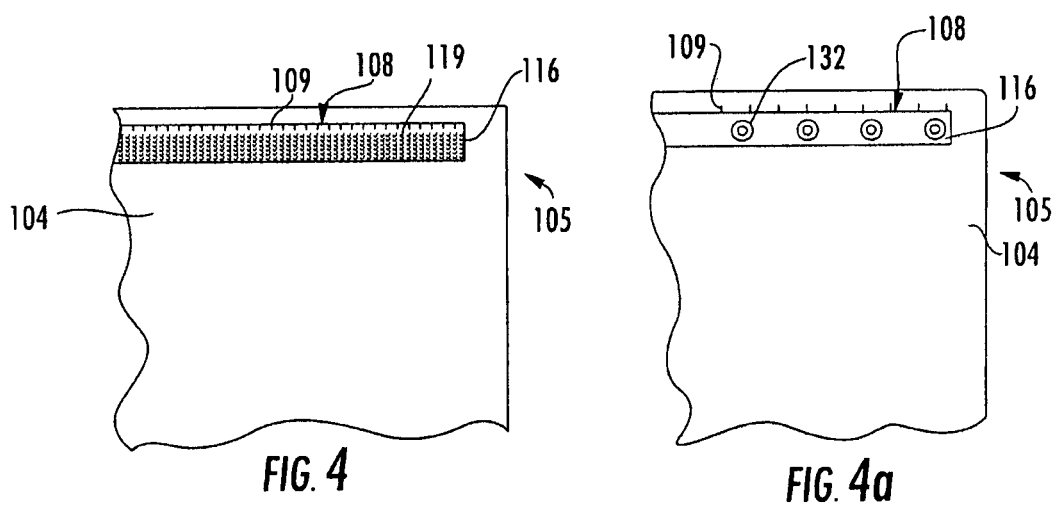
FIG. 4 is a partial plan view of the encircled portion of FIG. 1, illustrating an exemplary fastening mechanism component.
FIG. 4a is a partial plan view of the encircled portion of FIG. 1, illustrating an exemplary fastening mechanism component.

Referring to FIG. 4, the encircled portion FIG. 1 illustrates mapboard 104 comprising receiving strip 116 extending horizontally along top portion 105 of mapboard 104. Receiving strip 116 is illustrated as comprising loop components 119 of a fastening mechanism 106 comprising hook 118 (see FIG. 3) and loop 119 components. Although the present embodiment illustrates receiving strip 116 having loop components 118, it is envisioned that receiving strip 116 may comprise either of hook 118 or loop 119 components of fastening mechanism 106.

FIG. 4a illustrates a further embodiment of the encircled portion of FIG. 1. Mapboard 104 is illustrated comprising receiving strip 116 extending horizontally across top portion 105 of mapboard 104 with receiving strip 116 comprising female couplings 132 of a fastening mechanism 106 (see FIG. 1) comprising male 130 (see FIG. 3a) and female 132 couplings. Although the present embodiment illustrates receiving strip 116 having female couplings 132, it is envisioned that receiving strip 116 may comprise either of female 132 or male 130 couplings of fastening mechanism 106.

Although FIG. 4 and FIG. 4a illustrate receiving strip 116 as approximately two inches in width and extending across top portion 105 of mapboard 104, alternate configurations exist. For example, receiving strip 116 may be positioned vertically, or may comprise strips located at the corners of mapboard 104.

Figure 5:
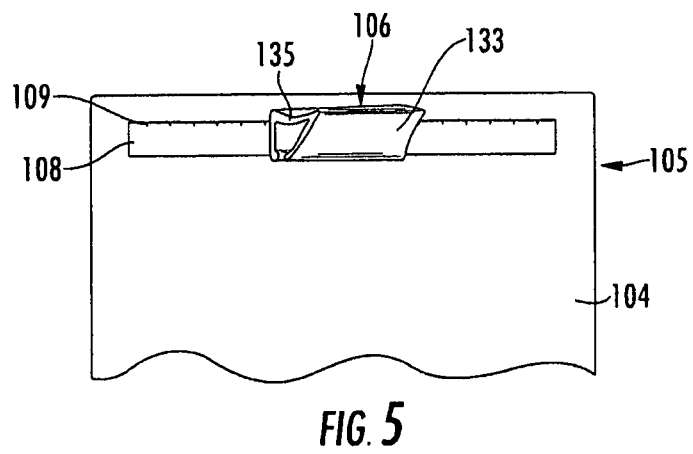
FIG. 5 is a partial plan view, illustrating an exemplary alignment device and fastening mechanism.

Further, embodiments of fastening mechanism 106 which do not include a receiving strip 114 or donor strip 116 are envisioned. FIG. 5 illustrates fastening mechanism 106 as comprising a clip 133. Although FIG. 5 illustrates fastening mechanism 106 as comprising only one clip 133, embodiments of fastening mechanism 106 comprising more then one clip 133 are envisioned. Additionally, although FIG. 5 illustrates clip 133 as comprising a compressible clamping element 135, embodiments in which clip 133 comprises a spring loaded element or a magnetic element are envisioned.

Figure 6:
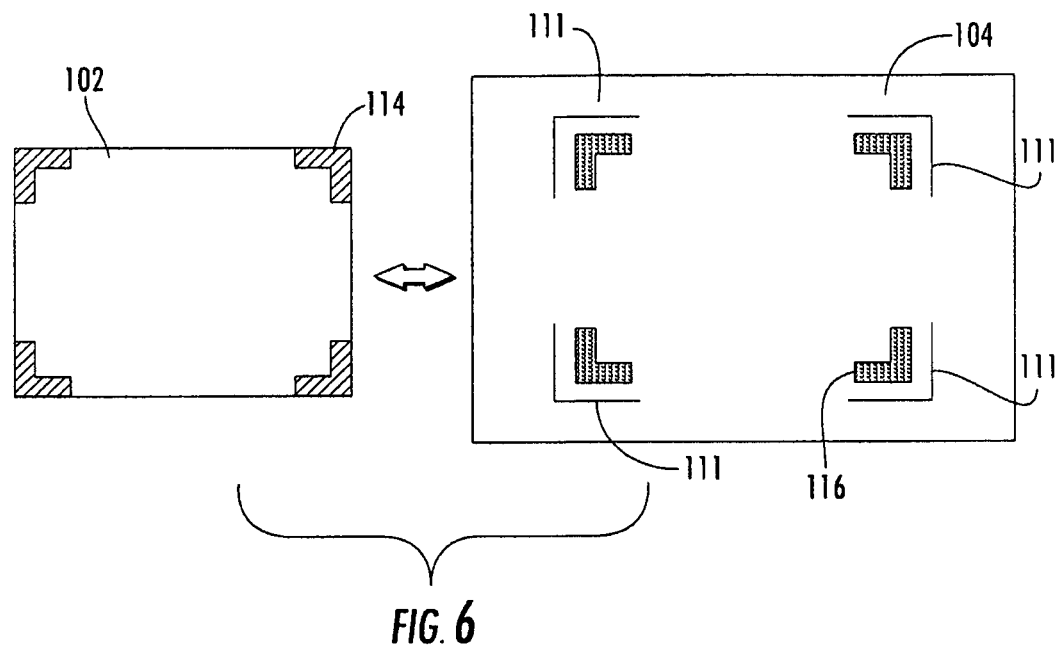
FIG. 6 is a plan view, illustrating a transparent overlay removed from a mapboard.
Figure 7:
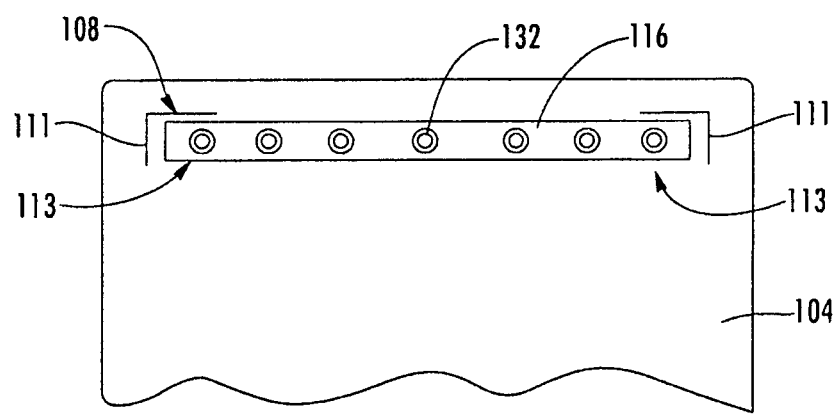
FIG. 7 is a partial plan view, illustrating an exemplary alignment device and fastening mechanism.

Alignment device 108 is illustrated in FIGS. 1, 4, 4a, 5, 6, and 7. Embodiments of alignment device 108 illustrated in FIGS. 1, 4, 4a, and 5 comprise a strip, approximately two inches in width and positioned horizontally across top portion 105 of mapboard 104 and further comprising registration marks 109 such as numerical markings or identification lines representing given measurements. FIGS. 6 and 7 illustrate embodiments of alignment device 108 comprising brackets 111, positioned in proximity to fastening mechanism 106 such as to provide a means for positioning transparent overlay 102 in an aligned fashion with respect to a displayed map 112 (see FIG. 1).

Referring to FIG. 4, alignment device 108 is illustrated as a strip, approximately two inches in width and positioned horizontally across the top portion 105 of mapboard 104. FIG. 4 further illustrates receiving strip 116 of fastening mechanism 106 (see FIG. 1), comprising loop components 119, as integral with alignment device 108. FIG. 4 represents a possible embodiment of alignment device 108 in which registration marks 109 of alignment device are not set apart from loop components 119 of receiving strip 116, although alternate embodiments are envisioned.

Referring to FIG. 4a, alignment device 108 is illustrated as a strip, approximately two inches in width and positioned horizontally across the top portion 105 of mapboard 104. FIG. 4a further illustrates receiving strip 116 of fastening mechanism 106 (see FIG. 1), comprising female couplings 132, as integral with alignment device 108. FIG. 4a represents a possible embodiment of alignment device 108 in which registration marks 109 of alignment device 108 are set apart from the female couplings 132 of receiving strip 116, although alternate embodiments are envisioned.

Referring to FIG. 5, alignment device 108 is illustrated as a strip, approximately two inches in width and positioned horizontally across the top portion 105 of mapboard 104. Alignment device 108 is further illustrated comprising registration marks 109 comprising identification lines representing given measurements. In the illustrated embodiment, fastening mechanism 106 comprises a clip 133 integral with at least a portion of alignment device 108, although embodiments are envisioned in which fastening mechanism 106 is not integral with any portion of alignment device 108.

Referring to FIG. 6, alignment device 108 is illustrated comprising four brackets 111 affixed to mapboard 104. As illustrated brackets 111 each define a single ninety degree shape, although alternate embodiments in which brackets 111 are semi-circular in shape or comprise more then one piece are envisioned. Brackets 111 are further illustrated positioned such that when transparent overlay 102 is affixed to mapboard 104 by fastening mechanism 106, each corner of transparent overlay 102 is positioned internal to the ninety degree shape defined by bracket 111.

Referring to FIG. 7, alignment device 108 is illustrated comprising two brackets 111 affixed to mapboard 104. As illustrated, brackets 111 each define a single approximately ninety degree shape positioned at opposing horizontal ends 113 of fastening mechanism 106 (see FIG. 1). As further illustrated, brackets 111 are positioned on mapboard 104 such that when transparent overlay 102 is affixed to mapboard 104 by fastening mechanism 106, the upper most corners of transparent overlay 102 are positioned internal to the ninety degree shape defined by bracket 111. Although brackets 111 are illustrated as comprising a single piece defining an approximate ninety degree shape, alternate embodiments in which brackets 111 are semi-circular in shape or comprise more then one piece are envisioned.

In operation collaborative mapboard system 100 meets a number of needs. FIGS. 8 and 9 illustrate various modes of operation which collaborative mapboard system 100 achieves.

Referring to FIG. 8, one embodiment according to the invention is illustrated in which mapped information 110 is accurately shared between one or more approximately identical maps 112. Map 112 is displayed on a common mapboard 104 mounted to a stand 200, however mapboard 104 is also envisioned to comprise a common wall-mounted mapboard or the like. Transparent overlay 102 affixes to mapboard 104 via fastening mechanism 106, illustrated in FIG. 8 as a hook and loop fastener. Fastening mechanism 106 is illustrated as comprising a donor strip 114, coupled to upper portion 120 of transparent overlay 102, and a receiving strip 116, coupled to top portion 105 of mapboard 104. In the illustrated embodiment donor strip 114 is illustrated as further comprising hook components 118 (see FIG. 3) and receiving strip 116 is illustrated as integral with alignment device 108 and further comprising loop components 119. Alignment device 108 is illustrated comprising registration marks 109 illustrated as comprising identification lines representing given measurements. Transparent overlay 102 affixes to mapboard 104, displaying map 112, through physical interaction of the hook components 118 of donor strip 114 and the loop components 119 of receiving strip 116. Once affixed to mapboard 104 and aligned over map 112, transparent overlay 102 is capable of receiving mapped information 110 through one or more of a grease pen, marker, or adhesive stickers. The positioning of map 112 and transparent overlay, in relation to registration marks 109 of alignment device 108, may be recorded in order that the alignment of map 112 and transparent overlay 102 to alignment device 108 may be replicated on different mapboards 104.

As illustrated in FIG. 8, transparent overlay 102 containing recorded mapped information 110 is then capable of detachment from mapboard 104 and being transferred to a different mapboard 104a, illustrated in present embodiment as a portable mapboard 104a. Mapboard 104a is illustrated in FIG. 8 displaying map 112a, approximately identical in size and content to map 112. Transparent overlay 102 containing recorded mapped information 110 is affixed to mapboard 104a through physical interaction of the hook components 118 (see FIG. 3) of donor strip 114 and the loop components 119a of receiving strip 116a which is illustrated as integral with alignment device 108a. The geographical and spatial relationship of transparent overlay 102 and map 112a to registration marks 109 of alignment device 108a are aligned to approximately mimic the alignment of map 112 and transparent overlay 102 to registration marks 109 of alignment device 108 on mapboard 104. For example, one method of alignment of transparent overlay 102 and map 112a on mapboard 104a, to mimic transparent overlay 102 and map 112 alignment on mapboard 104, is through fastening donor strip 114 to receiving strip 116a such that the corners of map 112a and the ends of donor strip 114 align with registration marks 109 of alignment device 108a which correspond to registration marks 109 of alignment device 108 used in alignment of transparent overlay 102 and map 112 on mapboard 104.

FIG. 8 further demonstrates that mapped information 110 may be recorded on transparent overlay 102 when affixed over map 112a displayed on mapboard 104a. Transparent overlay 102 may then be transferred to mapboard 104 displaying map 112. Transparent overlay 102 and map 112 are aligned, on mapboard 104 using alignment device 108, in a manner which mimics the geographical and spatial relationship of transparent overlay 102 with displayed map 112a on mapboard 104a. As illustrated in FIG. 8, when maps 112, 112a approximately identical in size and content are displayed on mapboard 104 and mapboard 104a, collaborative mapboard system 100 facilitates the accurate sharing of mapped information 110 between the maps 112, 112a.

Referring to FIG. 9, another embodiment according to the invention is illustrated in which mapped information 110 is accurately transferred between one or more approximately identical maps 112 displayed in different media states. As illustrated, computer 210 displaying digital map 112b electronically communicates with projector 212. Projector 212 projects image 112c of digital map 112b onto electronic mapboard 104b. Transparent overlay 102 affixes to electronic mapboard 104b via fastening mechanism 106, illustrated in FIG. 9 as a hook and loop fastener. Fastening mechanism 106 is illustrated as comprising a donor strip 114 coupled to upper portion 120 of transparent overlay 102, and a receiving strip 116 coupled to top portion 105 of electronic mapboard 104b. In the illustrated embodiment donor strip 114 is illustrated as further comprising hook components 118 (see FIG. 3) and receiving strip 116 is illustrated as integral with alignment device 108 and further comprising loop components 119. Alignment device 108 is illustrated comprising registration marks 109 illustrated as comprising identification lines representing given measurements. Transparent overlay 102 affixes to electronic mapboard 104b, displaying projected image 112c of digital map 112b, through physical interaction of the hook components 118 of donor strip 114 and the loop components 119 of receiving strip 116. Once affixed to electronic mapboard 104b and aligned over projected image 112c of digital map 112b, transparent overlay 102 is capable of receiving mapped information 110 through one or more of a grease pen, marker, or adhesive stickers. The positioning of projected image 112c on electronic mapboard 104b and transparent overlay 102, in relation to registration marks 109 of alignment device 108, can be recorded in order that the alignment of projected image 112c and transparent overlay 102 to alignment device 108 may be replicated on different mapboards 104. Mapped information 110 may be added to digital map 112b by means of input into computer 210 and reflected in projected image 112c of digital map 112b. Likewise, mapped information 110 may be recorded on electronic mapboard 104b while digital map 112b is projected onto electronic mapboard 104b, or mapped information 110 may be directly recorded on transparent overlay 102 affixed to electronic mapboard 104b over displayed projected image 112c. Mapped information 110 reflected on displayed image 112c of digital map 112b projected on electronic mapboard 112b is capable of being manually copied onto transparent overlay 102 using one or more of a grease pen, marker, or adhesive stickers.

As illustrated in FIG. 9, transparent overlay 102 containing recorded mapped information 110 is then capable of detachment from electronic mapboard 104b and being transferred to a different mapboard 104a, illustrated in the present embodiment as a portable mapboard 104a. Mapboard 104a is illustrated in FIG. 9 displaying map 112a, approximately identical in size and content to projected image 112c of digital map 112b. Transparent overlay 102 containing recorded mapped information 110 is affixed to mapboard 104a through physical interaction of the hook components 118 (see FIG. 3) of donor strip 114 and the loop components 119a of receiving strip 116a which is illustrated as integral with alignment device 108a. The geographical and spatial relationship of transparent overlay 102 and map 112a to registration marks 109 of alignment device 108a are aligned to approximately mimic the alignment of projected image 112c of digital map 112b and transparent overlay 102 to registration marks 109 of alignment device 108 on electronic mapboard 104b. For example, one method of alignment of transparent overlay 102 and map 112a on mapboard 104a, to mimic transparent overlay 102 and projected image 112c alignment on electronic mapboard 104b, is through fastening donor strip 114 to receiving strip 116a such that the corners of map 112a and the ends of donor strip 114 align with registration marks 109 of alignment device 108a which correspond to registration marks 109 of alignment device 108 used in alignment of transparent overlay 102 and projected image 112c on electronic mapboard 104b.

FIG. 9 further demonstrates that mapped information 110 may be recorded on transparent overlay 102 when affixed over map 112a on mapboard 104a. Transparent overlay 102 may then be transferred to electronic mapboard 104b in electronic communication with computer 200. Transparent overlay 102 is aligned on electronic mapboard 104b using alignment device 108, in a manner which mimics the geographical and spatial relationship of transparent overlay 102 with displayed map 112a on mapboard 104a. Mapped information 110 on transparent overlay 102 is then communicated to computer 210 by one or more means including electronic mapboard 104b scanning mapped information 110 and electronically communicating the mapped information 110 to computer 210 and incorporated into digital map 112b. Further, alternative embodiments include a user manually tracing over mapped information 110 on transparent overlay 102 such that electronic mapboard 104b is contacted during the tracing of the mapped information 110 and the location of the traced mapped information 110 being electronically transferred to computer 210 and incorporated in digital map 112b. Through the implementation of a scalar corresponding to the difference in scale between map 112 and digital map 112b, and alignment of transparent overlay 102 with alignment device 108, collaborative mapboard system 100 facilitates accurate transfer of mapped information 110 between the maps 112a, 112b displayed in different media states.

While this invention has been described as having an exemplary design, the present invention may be further modified within the spirit and scope of this disclosure. This application is therefore intended to cover any variations, uses, or adaptations of the invention using its general principles. For example, this invention applies to non-mapped information, including any information that uses a type of template that may be accurately transferred by using a variation of the disclosed system. For example, this invention applies to non-mapped information, including any information that uses a template that may be accurately transferred by using a variation of the disclosed system. Further, this application is intended to cover such departures from the present disclosure as come within known or customary practice in the art to which this invention pertains.

What is claimed is:

1. A mapboard system for transferring mapped information between maps, said mapboard system comprising:
   an analog map portion;
   a transparent overlay which accepts analog mapped information;
   a first alignment device on the transparent overlay;
   a second alignment device on the analog map portion, the first and second alignment devices cooperating to accurately align the analog mapped information on the transparent overlay relative to the analog map portion;
   a fastening mechanism selectively affixing the transparent overlay to the analog map portion;
   a computer system comprising a digital map portion which accepts digital mapped information, the digital map portion scaled to correspond to the analog map portion,
   wherein the digital mapped information is converted to analog format and the digital mapped information is aligned with at least one of the first alignment device and the second alignment device, such that the digital mapped information is aligned with the analog map for accurate display on the analog map portion, and wherein the analog mapped information is converted to digital format and the analog mapped information is aligned with the digital map portion for accurate display on the digital map portion.

2. The mapboard system of claim 1, wherein the fastening mechanism includes a first component coupled to the transparent overlay and a second component coupled to the analog map portion.

3. The mapboard system of claim 1, wherein at least one of the analog map portion and the digital map portion includes an electronic display capable of displaying a map.

4. The mapboard system of claim 3, wherein the electronic display is an electronic whiteboard capable of electronic communication with the computer.

5. The electronic whiteboard of claim 4, further comprising means for projecting the digital map portion onto the electronic whiteboard.

6. The mapboard system of claim 1, wherein the analog map portion further comprises means for displaying a plurality of paper maps within a plurality of non-porous, weather resistant sleeves.

7. The mapboard of claim 6, further comprising a plurality of rigid planar backing members attached to one side of each said plurality of non-porous, weather resistant sleeves.

8. The mapboard system of claim 1, wherein the first alignment device on the transparent overlay is part of the analog mapped information, the digital mapped information including a third alignment device aligned with the first alignment device when the analog mapped information is aligned with the digital map portion.

9. The mapboard system of claim 1, wherein the analog mapped information is converted to digital format by scanning the analog mapped information from the overlay.

* * * * *